United States Patent Office 2,980,836
Patented Apr. 18, 1961

2,980,836

SERVOMOTOR AUTOMATIC CONTROL SYSTEM ESPECIALLY FOR MACHINE TOOLS

Kenneth William Hathaway, Chalfont St. Giles, England, assignor to Electric & Musical Industries Limited, Hayes, England, a company of Great Britain Filed Mar. 7, 1960, Ser. No. 13,045

Claims priority, application Great Britain Mar. 7, 1959

3 Claims. (Cl. 318—28)

This invention relates to automatic control systems, especially for machine tools, and is an improvement in or modification of the invention claimed in the specifications of co-pending United States applications Serial Nos. 753,793 and 810,121.

In a proposed form of automatic control system for machine tools signals derived from a record and representative of values of one co-ordinate at discrete reference points on a desired locus for the tool of the machine are converted into electrical analogue signals and applied to an interpolator from which is derived a continuously variable electrical command signal which forms one input to servo means arranged to displace the tool or work carrier in the respective co-ordinate direction. A second input to the servo means is a signal representative of the displacement imparted by the servo means, and the servo means operates in known manner to maintain equality between these two input signals.

In the specifications of the aforesaid applications there is described an automatic control system wherein a variable is controlled in response to an error signal derived by comparing a command signal and a feedback signal which is responsive to the value of the variable, and in which a potential divider, tapped at a series of reference points, is provided and a selector switch having an output terminal is operable to switch the output terminal from one reference point to the next in one sense to represent a predetermined variation of command signals and which is operable to switch the output terminal from one reference point to the next in the opposite sense in response to a corresponding variation of the variable, whereby the signal set up at said output terminal represents at least a major portion of said error signal.

In such a control system it is arranged that the second input to the servo means is always zero so that each analogue signal applied to the interpolator does not represent the required displacement with reference to any fixed datum point, but with respect to the instantaneous relative position of the worktable and tool. Thus in the case of a continuous locus of the tool the magnitude of the analogue signal is normally less than would be the case if it referred to a fixed datum point with consequent advantages described in the specification of the aforesaid applications. In the case of a discontinuous locus, however, the magnitude of an analogue signal may be greatly increased by being referred to the instantaneous relative position of the worktable and tool, for example if the tool is a drill and is required to drill a hole at position remote from the previously drilled hole.

The object of the invention is to provide an automatic control system by which the difficulty referred to in the preceding paragraph can be reduced.

According to the invention there is provided an automatic control system according to the specifications of United States applications Nos. 753,793 and 810,121 in which there is provided switching means operable to switch the output terminal from one reference point to the next independently of said selector switch, so as to vary the datum point with reference to which displacement occurs in response to a command signal.

The switching means are preferably manually operable, so that the datum point to which a command signal is referred, can be displaced relatively to the instantaneous relative position of worktable and tool.

In order that the invention may be clearly understood and readily carried into effect it will now be more fully described with reference to the accompanying drawings, in which.

Figure 1:
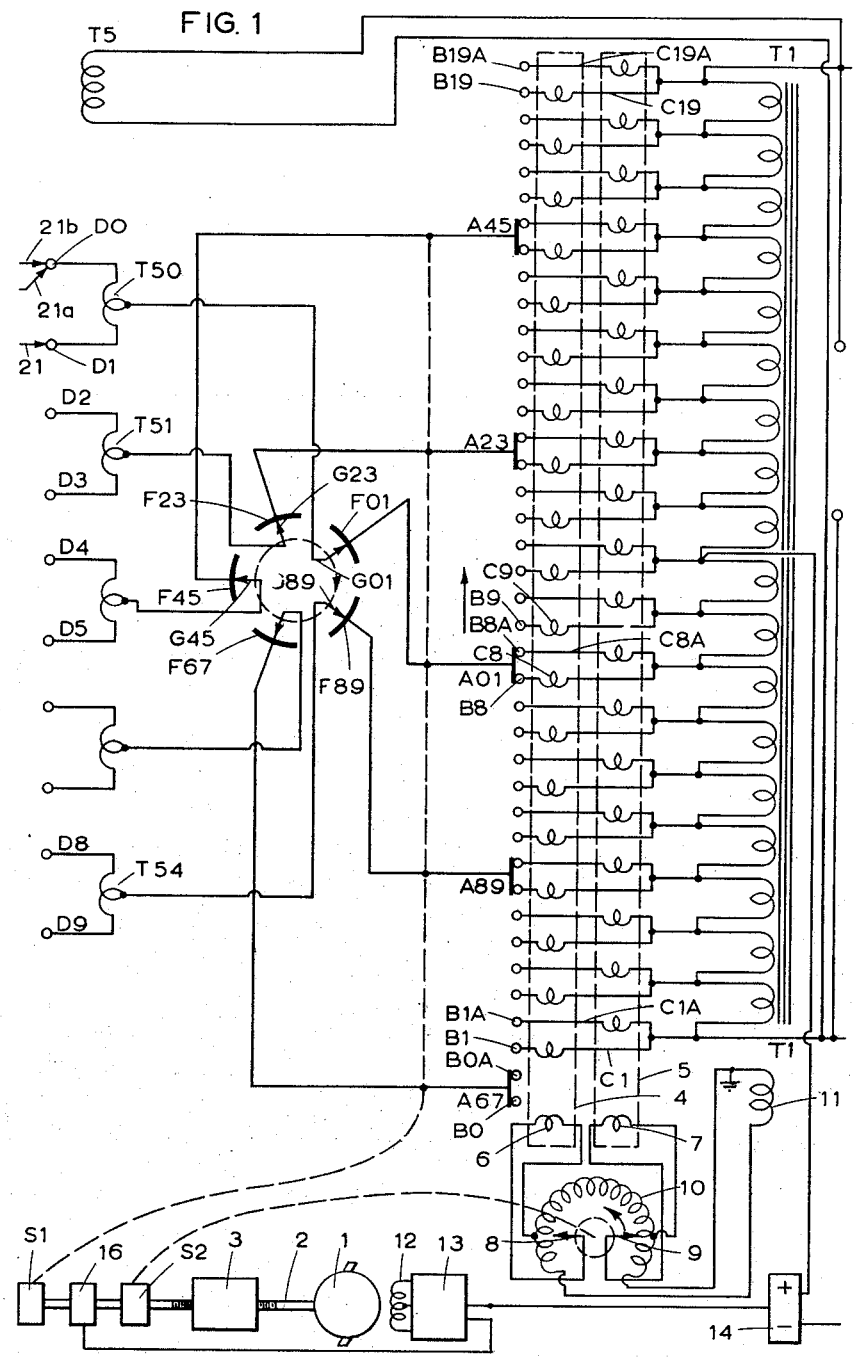
Figure 1 illustrates one part of an automatic control system for machine tool according to one example of the invention.
Figure 2:
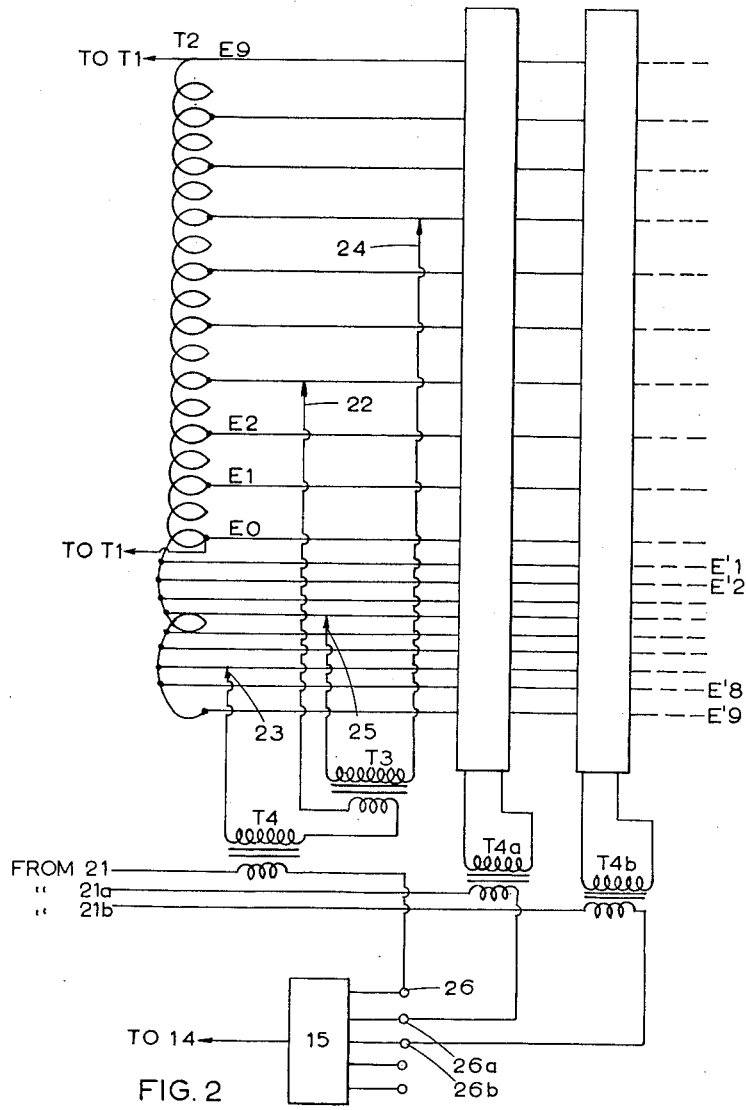
Figure 2 illustrates another part of that control system.

The two parts of the control system shown in Figures 1 and 2 are connected together in practice, relevant connections being indicated in the respective figures.

The control system is similar to the control system shown in Figures 1a and 1b of the specification of application Serial No. 810,121 and the same reference numerals are used to denote corresponding components of of the accompanying drawings and in Figures 1a and 1b of the aforesaid complete specification. Referring to the accompanying drawings, reference 1 denotes a servo motor which drives a lead screw 2, the nut of which is attached to a table 3 which in the present example is the worktable of a machine tool to which the control system is applied. The lead screw 2 also provides two switches S1 and S2 which form part of a position analogue unit. The switches S1 and S2 are shown in two separate parts in the drawing to facilitate illustration and the switch S1 comprises five wipers A01, A23, A45, A67 and A89 which are mechanically coupled so as to rotate as a unit when the lead screw is rotated. The wipers are shown in a straight line in the drawing, but are in fact rotary wipers. The wipers are furthermore arranged when the lead screw 2 rotates to traverse a circle of contacts B. There are twenty pairs of these contacts the first pair being denoted by the references B0 and B0A, the second pair being denoted by references B1, B1A and so on to B19 and B19A. The contacts B are connected by conductors C1, C1A . . . C19, C19A to equally spaced tapping points on an auto-transformer T1 wound on a toroidal core, the conductors C being laced selectively through injector toroidal cores 4, 5 between the contacts and the transformer T1. It will be observed that the conductors B of each pair are connected to the same tapping point on the auto-transformer T1 whereas one conductor, like C1 is laced through the toroidal core 4 and not through the core 5, the other conductor C1A is laced through the toroidal core 5 and not through the core 4. The toroidal cores 4 and 5 are represented in the drawing by means of dotted rectangles. The lacing of a conductor through one of the toroidal cores 4 and 5 is equivalent to providing a one turn secondary winding on the respective core and accordingly where a conductor is laced through a particular core, that fact is represented by showing a single turn of that conductor within the respective rectangle representing the core. The toroidal cores 4 and 5 have primary windings 6 and 7, and the primary winding 6 is connected to one wiper 8 which forms part of the switch S2 and has its other end connected to a fixed tapping point on an auto-transformer 10. Similarly the primary winding 7 of the core 5 has one end connected to a wiper 9 and its other end connected to a second fixed tapping point on the auto-transformer 10. The wipers 8 and 9 are mechanically connected but electrically separate and the two wipers are driven by the lead screw 2 so as to traverse tapping points on the auto-transformer 10 which is supplied with reference voltage from a transformer secondary winding 11 on the same core as the transformer T1. The tapping points on the auto-transformer 10 are disposed on an arc whose extent is greater than 180° and the two fixed tapping points aforesaid are 180° apart. The wipers 8 and 9 are also 180° apart. Suitable gearing is provided between the lead screw and the wipers A of the switch S1 and also the wipers 8 and 9 of the switch S2 so that the latter wipers rotates at twenty times the rate of the former. The wipers A of the switch S1 are of the make-before break type.

When rotation of the lead screw causes the wipers A to traverse the contacts B, the electro-motive forces injected into the conductors C via the cores 4 and 5 are such as to cause an almost smooth variation of the potential at the contacts A. For example when the wipers A are in the positions indicated in the drawing, namely bridging pairs of the contacts B which are connected to the same tapping points, no electro-motive forces are injected into the conductor C by the cores 4 and 5 since as can be seen from the drawing, there is no voltage across the primary windings 6 and 7. Consider the wiper A01 and assume that it moves upward, as seen in the drawing, from the position of contact with B8 and B8A. This movement represents rotation of the lead screw 2 in one direction and it is arranged that such rotation rotates the wipers 8 and 9 of the switch S2 in the direction indicated by the arrow near these wipers. As the wiper A01 moves upward, the electro-motive forces injected into the conductors C8 and C8A by the toroids 4 and 5 vary equally in the same sense, the polarities of the windings 6 and 7 being selected accordingly. This continues until the wiper 8 leaves the tapping on the auto-transformer 10 whereafter the injection of electro-motive force into the conductor C8, ceases. The extent of the tappings on the auto-transformer 10 beyond 180° is arranged to be such that injection into C8 does not cease until the wiper A01 has moved out of contact with contact B8. Upon the wiper A01 continuing to move in contact with B8A, the electro-motive force injected into the conductor C8A continues to increase in linear dependence upon the movement of the wiper A01, but before wiper A01 moves into contact with B9, the wiper 8 re-engages the tappings on the other end of the auto-transformer 10 and causes electro-motive force to be injected into the conductor C9 which is the negative of the complement of the electro-motive forces injected at the respective time into the conductor C8A so that the voltage at the two terminals B8A and B9 are equal. Therefore when eventually the wiper A01 engages the contact B9, which it does before leaving the contact B8A, no discontinuity occurs in the voltage on the wiper A01, the voltage on the two contacts B8A and B9 remaining equal until the wiper A01 leaves the contact B8A.

The five wipers A are connected selectively to the mid points of five transformer secondary windings T50 to T54 via a switch indicated generally by the reference SW. The switch SW comprises five contacts F01, F23, F67, F89 which are connected to the wipers A01 . . . A09. The switch SW is in the form of a rotary switch the contacts F of which are arranged in a circle and has five wipers G01, G23 . . . G89. In the drawing the wipers G are shown in contact with the contacts F in such a sense that G01 contacts F01, G23 contacts F23 and so on. The wipers G can hovever be rotated so that the wiper G01 contacts F67 and so on successively, the other wipers G changing contacts likewise. The wipers G01 to G89 are connected respectively to the mid points of the windings T50 to T54 which windings have a common primary winding connected across auto-transformer T1. The ends of the secondary windings T50 to T54 are connected respectively to ten contacts D0 to D9. The turns ratios between the primary winding T5 and the secondary windings T50 to T54 are such that the voltages at the contacts D0 to D9 are equal to the voltages picked up by the respective wipers A plus or minus one quarter of the voltage difference between adjacent wipers A. The contacts D may of course be selectively connected to the different wipers A by the switch SW and in the drawing the contacts D0 and D1 are shown connected to the contact A01. Therefore the voltage on the contact D0 is equal to the voltage on the wiper A01 minus 0.5 volt and the voltage on the contact D1 is equal to the voltage on the wiper A01 plus 0.5 volt, assuming that the voltage difference between tapping points on T1 is 0.5 volt.

The motor has a field winding 12 the current in which is controlled by a power amplifier 13 which receives the output signal from a differencing circuit 14. One input to the differencing unit is derived from the midpoint of the transformer T1 which may be rotated whilst the second input to the differencing unit is derived from an interpolating arrangement 15 (Figure 2) which is shown in block form since it is of the construction described in the United States patent specification No. 2,929,555. A tacho generator 16 is provided driven by the lead screw 2 as indicated, for applying a velocity feedback signal to the amplifier 13 in known manner. As explained in the United States patent specification No. 2,929,555 the interpolating arrangement 15 requires, as input signals, voltage analogue signals which represent the values of one co-ordinate of successive reference points on the locus to be described by the worktable 3 with reference to the machine tool, the co-ordinate being that which is varied under control of the motor 1. The interpolating arrangement 15 has five input terminals to which analogue signals for interpolation are applied in a cyclic order, the signals applied to three of the terminals being used at any one time to determine the span within which the interpolation is carried out. The drawing shows means for setting up an analogue signal for one input terminal of the interpolating arrangement 15, said means comprising five selectors 21 to 25 one corresponding to each of five decimal orders required to achieve the accuracy of one part in ten thousand. The selectors may in some cases be set by hand but may also be set in response to a record such as a punched tape, punched card or the like by means of uniselectors or relays. The most significant digit is set up by the selector 21 which in the example illustrated makes contact with stud D1, although it may of course make contact with any one of the studs D. As explained in the specifications of United States patent applications Serial Nos. 753,793 and 810,121 the connections from the studs A to the studs D are such that the studs D remain stationary despite rotation of the wipers A. The means for achieving this have not been illustrated in the accompanying drawing since they may be the same as described in the last-mentioned specification. The selectors 22 and 24 are arranged to contact selected bus-bars E0 to E9 leading from the transformer T2 which is energised from the same voltage source of the transformer T1. In operation the selectors 22 and 24 are set to represent second and fourth order decimal digits of a desired analogue value. Similarly the selectors 23 and 25 are set to represent the third and fifth decimal digits, being arranged to contact bus-bars E0 and E'1 to E'9 leading from a transformer T'2 which may in fact be an extension of the transformer T2. The number of turns on T'2 is determined so that the electromotive force between adjacent bus-bars is 1/10 of that between adjacent bus-bars connected to T2. The transformers T3 and T4 are arranged to add (in suitable ratio) to any voltage derived from the selector 21 the voltage between the selectors 22 and 23 on the one hand and between the selectors 24 and 25 on the other hand. The transformer T3 has a step down ratio of 100:1 and the transformer T4 has a step down ratio which is such that the voltage between adjacent bus-bars connected to T2 has a value of 0.1 volt when transferred to the secondary winding of T4. With the selectors 22 to 25 in the positions shown, the voltage across the secondary winding of T4 is 0.3764 volt and this is added to any voltage between the selector 21 and the midpoint of the transformer T1. Similar selector arrangements, including transformers T4a and T4b are provided for adding fractional voltages to the voltages picked up by the selectors 21a and 21b. These additional selector arrangements are represented merely by rectangles in Figure 2.

When the switches S1 and S2 are in the positions shown in the drawing, the voltage on the contact D1, which is engaged by the selector 21 is minus 1 volt with respect to the midpoint of T1, and the voltage applied to the terminal 26 of the interpolator has the value minus 1 plus 0.3764 volt. Assume that the output signal of the interpolator 15 has the same value at a given instant. Then the input signal of the amplifier 13 from the differencing circuit 14 has the same value and this represents the error in the position of the workable with respect to the commanded position, namely the analogue of 1.3764 volts. The motor 1 therefore operates to move the worktable 3, and simultaneously the switches S1 and S2 until the output of the amplifier 13 becomes diminishingly small. This occurs when the wiper A01 is moved to a position which is 0.5+0.3764 volt below the centre of the transformer T1, bearing in mind that the voltage on D1 is 0.5 volt above that on A01. The required position is reached when A01 is in contact with B8A and the wiper 9 injects a positive voltage of .1236 volt into the conductor C8A by way of the core 5. When this condition has been obtained, the table 8 has been displaced according to command. The operation of the arrangement is described in greater detail in the specifications of co-pending United States patent applications Nos. 753,793 and 810,121.

If after displacing the table to the position corresponding to a command signal of 1.3764 volts it is required to displace the worktable without performing any operation on the workpiece to another position corresponding to a command of 5+ΔV volts, where ΔV is the fractional signal injected by the transformer T4, then the magnitude of the actual analogue signal which is required to be set up by the selectors may be reduced by manually rotating the switch Sw until the wiper G45 engages the contact F01 and so on. This applies to the contact D5 the voltage which was previously applied to the contact D1 and the servo motor will then operate to move the table 3 to the new commanded position in response to a change in the setting of the selectors 21 to 25 equal only to the difference between ΔV and the previous command. Therefore the switch SW provides a manually operable coarse adjustment of the datum point to which the analogue signal is referred, the datum point being adjustable in steps of ⅕ of the unit range of the relative movement between the worktable and tool. Further by manually rotating the switch SW continuously through several revolutions, the worktable can be displaced, with respect to the tool, through a distance corresponding to several times the range of T1.

The inclusion of the interpolator 15 in the control system infers that the system may be used to cause the worktable to describe a continuous contour with reference to the tool. The use of the switch SW is on the other hand advantageous especially where the tool is required to move in succession to a series of discrete positions for example so that a hole may be drilled in each position, and if only the latter function is required of the control system, the interpolator may be dispensed with, together with the additional selectors 21a, 21b and so on. It will be understood moreover that the invention described may be applied to other forms of control system, such for example as those described in the specifications of co-pending United States patent applications No. 753,793 and 810,121.

What I claim is:

1. An automatic control system comprising a part whose displacement is to be controlled, a servo motor for producing displacement of said part, a voltage divider tapped at a series of reference points, a series of contacts connected respectively to said reference points, an error signal lead for applying a signal to said servo motor, differential switching means for connecting said lead to one of said contacts, said differential switching means comprising command means for switching said lead from one of said contacts to another to represent a desired displacement of said part, feedback means for switching said lead from one of said contacts to another in response to displacement of said part, said servo motor being responsive to the signal from said lead to tend to displace said part, and said feedback means being responsive to displacement of said part in the sense tending to counteract the switching of said lead produced by said command means and additional switching means operable to switch said lead from one of said contacts to another independently of said command means and of said feedback means, so as to vary the datum point wtih reference to which displacement occurs in response to said command means.

2. A system according to claim 1, said differential switching means comprising a plurality of selectors spaced to make contact simultaneously with a corresponding plurality of said contacts, a mechanical coupling constituting said feedback means for switching said selectors concomitantly from one contact to another in response to movement of said part, a series of fixed contacts connected electrically by said additional switching means to said selectors, and a further selector constituting said command means movable to connect said output lead to a selected one of said fixed contacts, said switching means being operable to switch said fixed contacts to selected ones of said first selectors.

3. A system according to claim 1, said switching means comprising a plurality of selectors spaced to make contact simultaneously with a corresponding plurality of said contacts, a mechanical coupling constituting said feedback means for switching said selectors concomitantly from one contact to another in response to movement of said part, a series of groups of contacts, one group of contacts for each of said plurality of selectors, a series of voltage means, one for each group of contacts for maintaining a predetermined voltage difference between adjacent ones of the respective group of contacts, means including said additional switching means for electrically connecting fixed points on said voltage means to said plurality of selectors, one point on each voltage means being connected to one selector, and a further selector constituting said command means movable to connect said output lead to a selected one of said fixed contacts, said additional switching means being operable to switch the fixed points on said voltage means to selected ones on said plurality of selectors.

No references cited.